United States Patent
Naitou et al.

(10) Patent No.: US 11,376,729 B2
(45) Date of Patent: Jul. 5, 2022

(54) ROBOT

(71) Applicant: FANUC CORPORATION, Yamanashi (JP)

(72) Inventors: Masahiro Naitou, Yamanashi (JP); Yuuki Kondou, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 66 days.

(21) Appl. No.: 16/718,347

(22) Filed: Dec. 18, 2019

(65) Prior Publication Data
US 2020/0238507 A1    Jul. 30, 2020

(30) Foreign Application Priority Data
Jan. 29, 2019 (JP) .............................. JP2019-013684

(51) Int. Cl.
*B25J 18/04* (2006.01)
*B25J 9/04* (2006.01)
(Continued)

(52) U.S. Cl.
CPC .............. *B25J 9/047* (2013.01); *B25J 9/042* (2013.01); *B25J 9/06* (2013.01); *B25J 18/04* (2013.01);
(Continued)

(58) Field of Classification Search
CPC . B25J 19/021; B25J 9/12; B25J 19/025; B25J 19/023; B25J 19/022; B25J 19/02; B25J 19/0041; B25J 17/0241; B25J 18/04
See application file for complete search history.

(56) References Cited

U.S. PATENT DOCUMENTS

2011/0314949 A1   12/2011  Long
2014/0084840 A1   3/2014   Osaka
(Continued)

FOREIGN PATENT DOCUMENTS

CN    106239509 A    12/2016
EP    2 764 959 A1   8/2014
(Continued)

OTHER PUBLICATIONS

Japanese Office Action dated Mar. 16, 2021, in connection with corresponding JP Application No. 2019-013684 (7 pp., including machine-generated English translation).
(Continued)

*Primary Examiner* — Jake Cook
*Assistant Examiner* — Gregory Robert Weber
(74) *Attorney, Agent, or Firm* — Maier & Maier, PLLC (57) ABSTRACT

A robot including at least one joint shaft that includes: a first link member and a second link member that are coupled about a rotation axis; a reducer that has an input shaft part fixed to the first link member and an output shaft part fixed to the second link member; a motor that generates a driving force to be input to the reducer; and an input-side encoder that detects a rotation angle of a rotation shaft of the motor; and an output-side encoder that detects a rotation angle between the first link member and the second link member. The output-side encoder includes a scale member that has a pattern and a sensor that detects the pattern on the scale member. The scale member is fixed to an attachment surface, and the sensor is attached to a fixing member fixed to the first link member.

3 Claims, 7 Drawing Sheets

(51) Int. Cl.
*G05B 19/4063* (2006.01)
*B25J 9/06* (2006.01)

(52) U.S. Cl.
CPC .............. *G05B 19/4063* (2013.01); *G05B 2219/39417* (2013.01)

(56) References Cited

U.S. PATENT DOCUMENTS

| | | | |
|---|---|---|---|
| 2014/0224057 | A1 | 8/2014 | Tanaka et al. |
| 2016/0008983 | A1 | 1/2016 | Osaka et al. |
| 2016/0216137 | A1* | 7/2016 | Horiguchi .......... G01D 5/34707 |
| 2017/0184425 | A1* | 6/2017 | Mitsuhashi ......... G01D 5/3473 |
| 2017/0232616 | A1 | 8/2017 | Shino |
| 2017/0274537 | A1* | 9/2017 | Kondo .................. B25J 9/0009 |
| 2019/0047161 | A1* | 2/2019 | Noda .................... B25J 13/088 |
| 2019/0217466 | A1* | 7/2019 | Ishikawa ................ G05B 19/42 |
| 2020/0298423 | A1 | 9/2020 | Ayuzawa |

FOREIGN PATENT DOCUMENTS

| | | | | |
|---|---|---|---|---|
| EP | 2965875 | A2 | | 1/2016 |
| JP | S62-264887 | A | * | 11/1987 |
| JP | H02-274482 | A | * | 11/1990 |
| JP | H02-274482 | A | | 11/1990 |
| JP | 2010-269412 | A | | 12/2010 |
| JP | 2013-211958 | A | | 10/2013 |
| JP | 2014065097 | A | | 4/2014 |
| JP | 2014151412 | A | | 8/2014 |
| JP | 2016-27951 | A | | 2/2016 |
| JP | 2017-140685 | A | | 8/2017 |
| JP | 2017159425 | A | | 9/2017 |
| JP | 2017177275 | A | | 10/2017 |
| JP | 2018-15836 | A | | 2/2018 |

OTHER PUBLICATIONS

Yuuki Kondou, U.S. Appl. No. 16/718,348, filed Dec. 18, 2019; 29 pages.
Japanese Office Action dated Nov. 9, 2021, in connection with JP application No. 2019-013684 (10 pp., including machine-generated English translation).
Decision of Refusal dated May 10, 2022 in Japanese Patent Application No. 2019-013684; with Computer-Generated English translation; 6 pages.

* cited by examiner

ROBOT

CROSS-REFERENCE TO RELATED APPLICATIONS

This application is based on Japanese Patent Application No. 2019-013684, the contents of which are incorporated herein by reference.

FIELD

The present invention relates to a robot.

BACKGROUND

Deflection or wobble may occur in an internal mechanism of a reducer due to insufficient rigidity. In order to reduce this, there is a known robot that includes, in addition to an input-side encoder that detects a rotation angle of a rotation shaft of a motor, an output-side encoder that detects a rotation angle of an output shaft of a reducer (for example, see Japanese Unexamined Patent Application, Publication No. 2016-27951).

This robot includes two links rotatably coupled by a bearing, an input part of the reducer to which the motor is fixed is fixed to one of the links, and the output shaft of the reducer is fixed to the other one of the links. The output-side encoder is an optical encoder and includes a scale that is provided on one of the adjacent surfaces of the two links adjacent in the direction of the rotation axis and a detection head that is provided on the other one of the adjacent surfaces.

SUMMARY

According to one aspect, the present disclosure provides a robot including at least one joint shaft including: a first link member and a second link member that are coupled so as to be rotatable about a rotation axis; a reducer that has an input shaft part fixed to the first link member and an output shaft part fixed to the second link member; a motor that generates a rotational driving force to be input to the reducer; an input-side encoder that detects a rotation angle of a rotation shaft of the motor; and an output-side encoder that detects a relative rotation angle between the first link member and the second link member, wherein the output-side encoder includes a plate-like scale member that has an angle-detection pattern and a sensor that detects the pattern on the scale member; the scale member is detachably fixed to an attachment surface that is provided in the opposite side surface of the second link member from the surface on which the output shaft part is fixed and that extends in a direction perpendicular to the rotation axis, such that one surface of the scale member in the plate thickness direction is brought into close contact with the attachment surface; and the sensor is attached to a fixing member fixed to the first link member.

DETAILED DESCRIPTION

A robot 1 according to one embodiment of the present disclosure will be described below with reference to the drawings.

Figure 1:
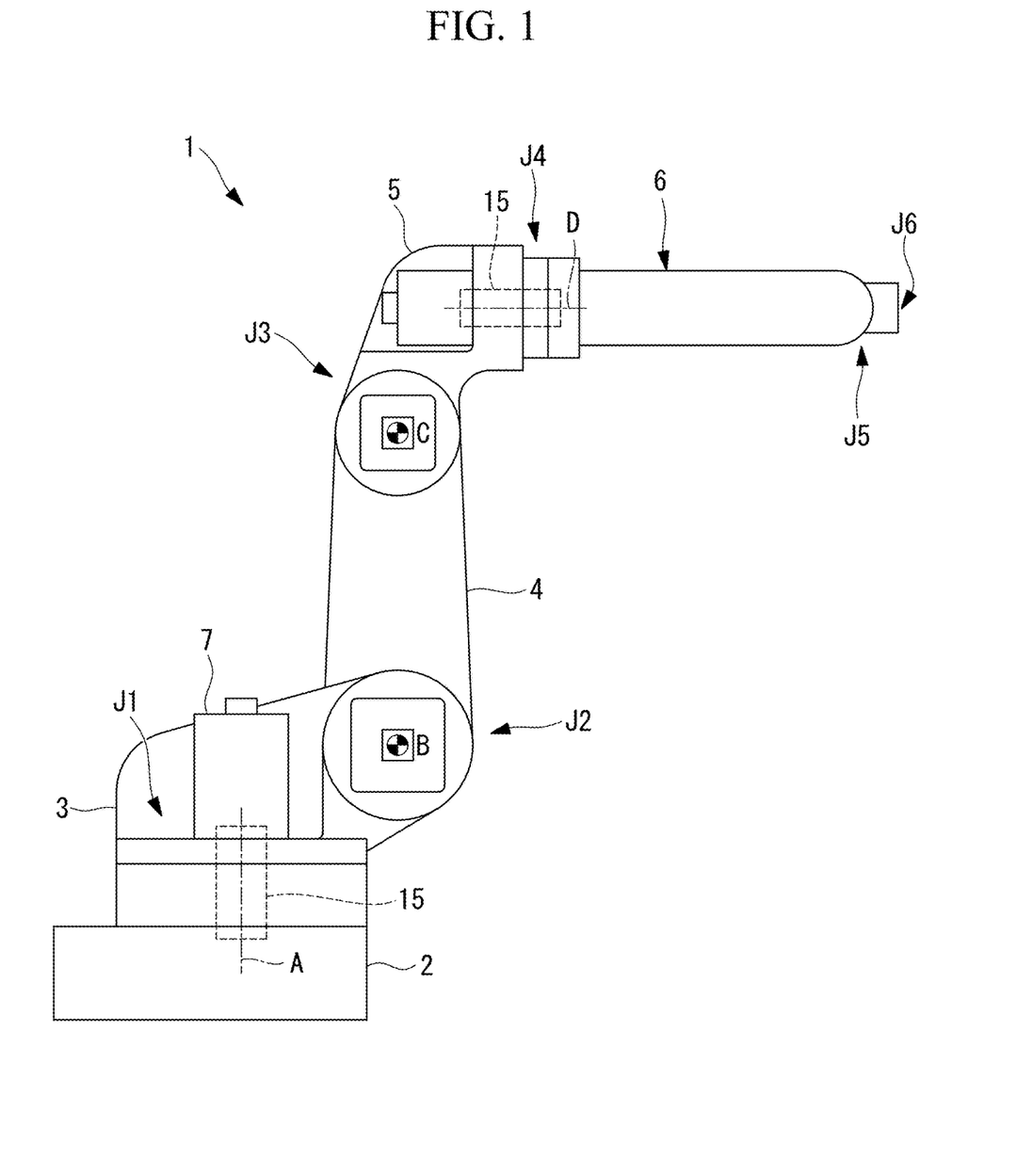
FIG. 1 is a side view showing a robot according to one embodiment of the present disclosure.
Figure 2:
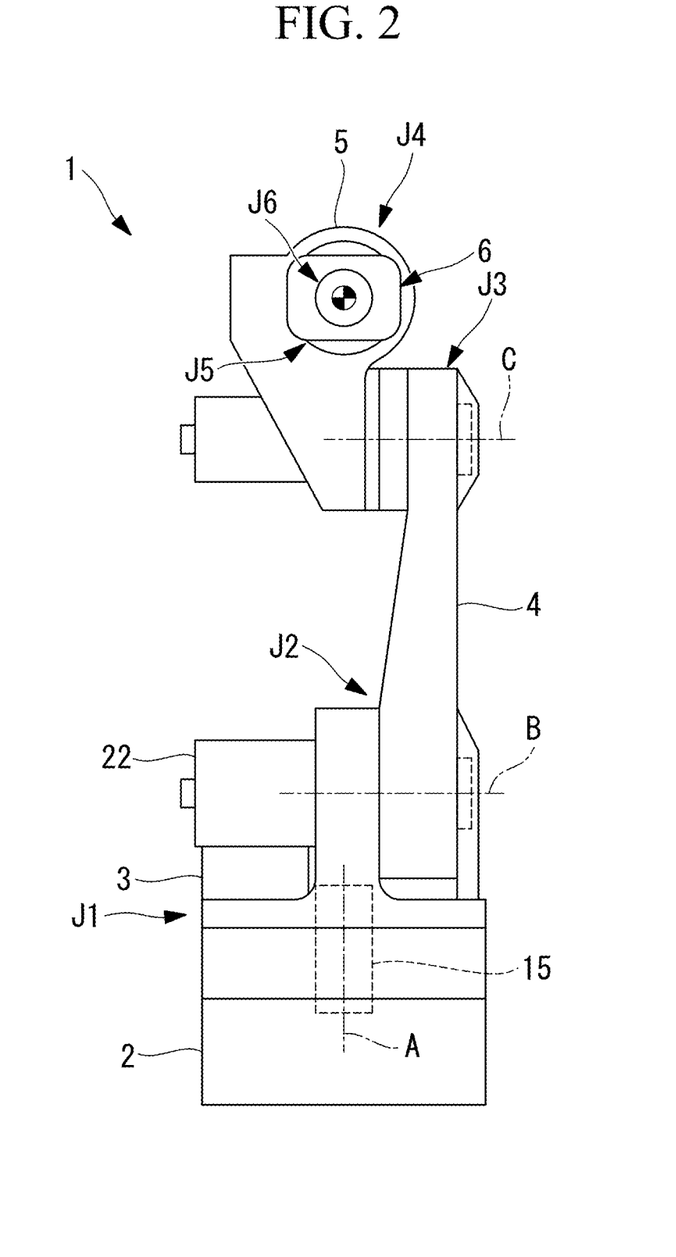
FIG. 2 is a front view showing the robot shown in FIG. 1.

As shown in FIGS. 1 and 2, the robot 1 of this embodiment is, for example, a 6-axis articulated robot.

The robot 1 includes six joint shafts J1, J2, J3, J4, J5, and J6. The first joint shaft J1 is provided between a base (first link member) 2 installed on a floor surface serving as an installation surface and a swivel body (second link member) 3 and allows the swivel body 3 to rotate about a vertical first axis (rotation axis) A, with respect to the base 2.

The second joint shaft J2 is provided between the swivel body (first link member) 3 and a first arm (second link member) 4 and allows the first arm 4 to rotate about a horizontal second axis (rotation axis) B, with respect to the swivel body 3. The third joint shaft J3 is provided between the first arm (first link member) 4 and a second arm (second link member) 5 and allows the second arm 5 to rotate about a third axis (rotation axis) C parallel to the second axis B, with respect to the first arm 4.

The fourth joint shaft J4 is provided between the second arm (first link member) 5 and a wrist unit (second link member) 6 and allows the wrist unit 6 to rotate about a fourth axis (rotation axis) D that has a twisted positional relationship with the third axis C, with respect to the second arm 5. The fifth joint shaft J5 and the sixth joint shaft J6 are disposed at a distal end of the wrist unit 6.

Figure 3:
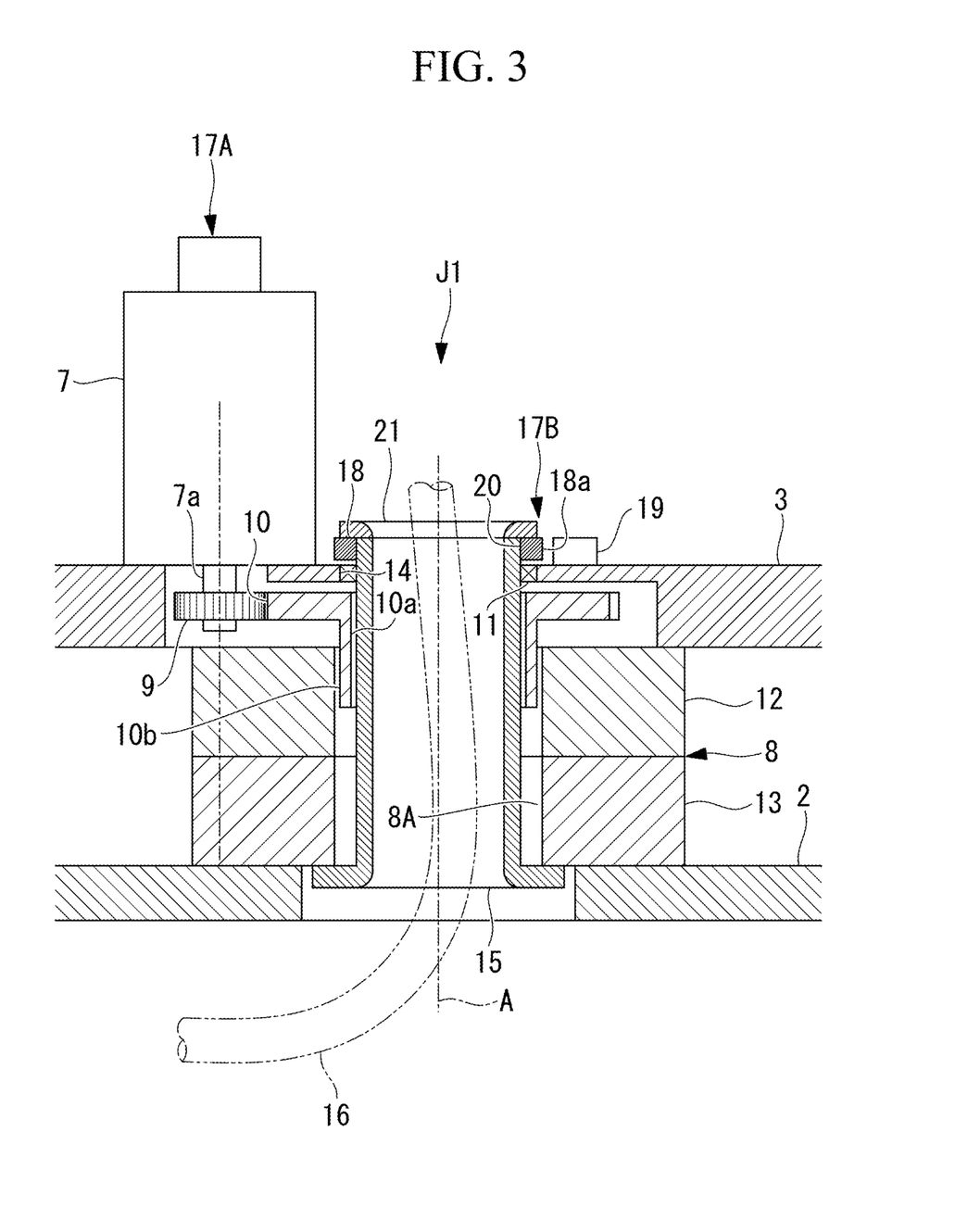
FIG. 3 is a longitudinal sectional view partially showing a first joint shaft of the robot shown in FIG. 1.

First, the configuration of the first joint shaft J1 will be described below. As shown in FIG. 3, the first joint shaft J1 includes: the base 2 and the swivel body 3, which are coupled so as to allow relative rotation about the first axis A; a motor 7 that generates a rotational driving force; and a reducer 8 that reduces the rotation of a rotation shaft 7a of the motor 7. The motor 7 is disposed at a position away from the first axis A. A pair of gears 9 and 10 that transmit the rotation of the rotation shaft 7a of the motor 7 to the reducer 8 are provided between the motor 7 and the reducer 8.

The gear 9 is fixed to the rotation shaft 7a of the motor 7, and the gear 10 is supported by a bearing (not shown) so as to be rotatable about the first axis A. The gear 10 has a central hole 10a penetrating therethrough along the longitudinal axis of a shaft 10b.

The reducer 8 includes an input shaft part 12 that is fixed to the swivel body 3 and an output shaft part 13 that is fixed to the base 2. When a rotational driving force of the motor 7 is input via the pair of gears 9 and 10, the reducer 8 reduces the rotation by means of an internal mechanism, thereby making it possible to output an amplified torque, in the form of rotation of the output shaft part 13 with respect to the input shaft part 12.

The reducer 8 includes, at a position including the first axis A, a hollow part 8A penetrating in the direction along the first axis A. The swivel body 3 is also provided with a through-hole 14 penetrating in the vertical direction, at a position corresponding to the hollow part 8A of the reducer 8.

Then, a cylindrical guide tube 15 is disposed in the hollow part 8A of the reducer 8 and the through-hole 14 of the swivel body 3 so as to pass through the hollow part 8A and the through-hole 14 over the entire length in the direction of the first axis A. A lower end of the guide tube 15 is fixed to the output shaft part 13 of the reducer 8, and an upper end thereof extends so as to protrude upward from the swivel body 3. In the figure, reference sign 11 denotes a seal member that seals a gap between the through-hole 14 of the swivel body 3 and the guide tube 15 while allowing rotation about the first axis A.

The inner diameter of the guide tube 15 has a sufficient size for allowing a wire body 16 including a cable for a mechanism part of the robot 1 to pass therethrough. The guide tube 15 is made of a material that reduces the friction with the wire body 16, which is made to pass therethrough, or at least an inner surface of the guide tube 15 is subjected to processing for reducing the friction.

In this embodiment, the first joint shaft J1 is provided with: an input-side encoder 17A that detects a rotation angle of the rotation shaft 7a of the motor 7; and an output-side encoder 17B that detects a rotation angle of the swivel body 3 with respect to the base 2. The input-side encoder 17A is provided on the motor 7, for example, and includes a scale member (not shown) that is fixed to the rotation shaft 7a of the motor 7 and a sensor (not shown) that optically reads an angle-detection pattern provided on the scale member.

As in the input-side encoder 17A, the output-side encoder 17B includes a scale member 18 and a sensor 19. The scale member 18 of the output-side encoder 17B is formed in a ring shape having a central hole (recessed section) 20, and a pattern is provided on an outer circumferential surface formed of a cylindrical surface 18a. The scale member 18 is fixed to the guide tube 15 by fitting an upper end of the guide tube 15 into the central hole 20. In the figure, reference sign 21 denotes a cover for covering the scale member.

The sensor 19 of the output-side encoder 17B is disposed radially outward with respect to the cylindrical surface 18a of the scale member 18 so as to be opposed thereto with a space therebetween. The sensor 19 includes a light emitting part and a light receiving part, which are not shown, and light emitted from the light emitting part and returning after being reflected at the cylindrical surface 18a of the scale member 18 is received by the light receiving part, thereby making it possible to read the pattern on the cylindrical surface 18a through changes in intensity of the received light.

Figure 4:
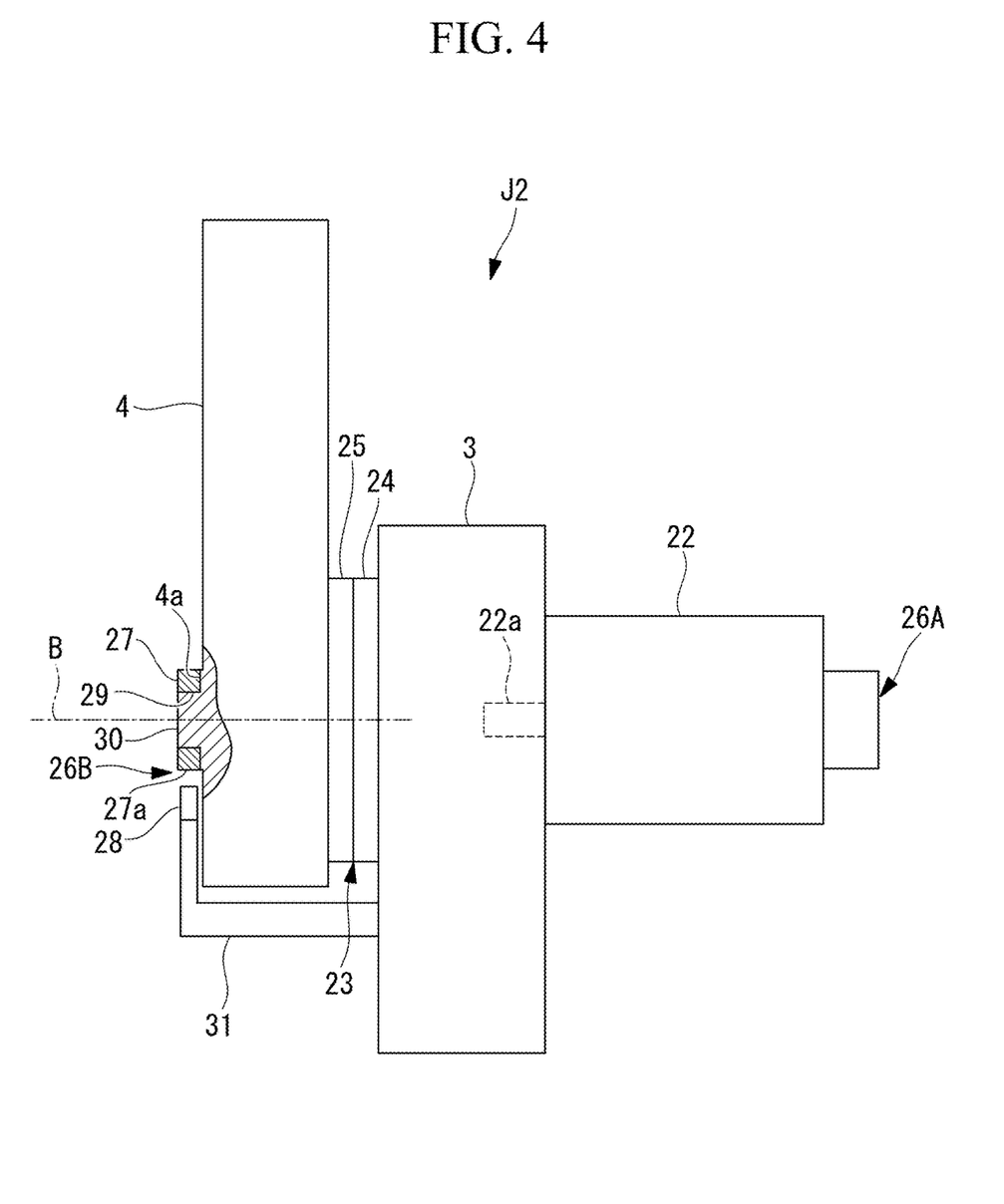
FIG. 4 is a front view partially showing a second joint shaft of the robot shown in FIG. 1.
Figure 5:
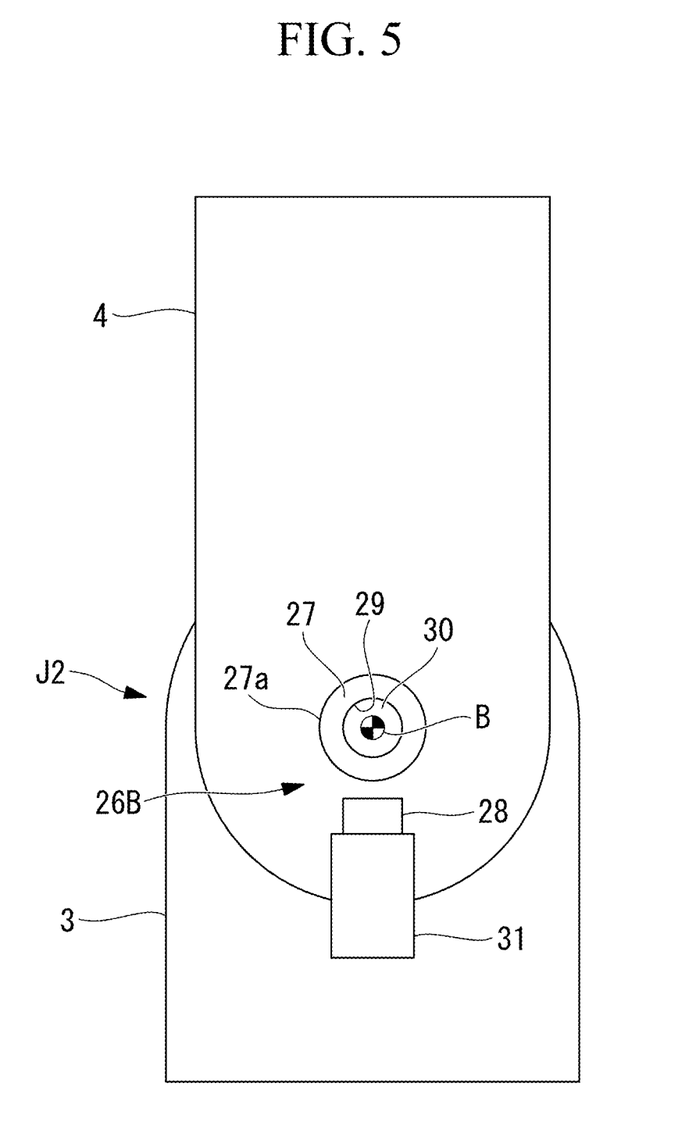
FIG. 5 is a side view partially showing the second joint shaft shown in FIG. 4.

Next, the configuration of the second joint shaft J2 will be described below. As shown in FIGS. 4 and 5, the second joint shaft J2 includes: the swivel body (first link member) 3 and the first arm (second link member) 4, which are coupled so as to allow relative rotation about the second axis (rotation axis) B; a motor 22 that generates a rotational driving force; and a reducer 23 that reduces the rotation of a rotation shaft 22a of the motor 22.

The reducer 23 includes an input shaft part 24 that is fixed to the swivel body 3 and an output shaft part 25 that is fixed to the first arm 4. When a rotational driving force of the motor 22 is input, the reducer 23 reduces the rotation by means of an internal mechanism, thereby making it possible to output an amplified torque, in the form of rotation of the output shaft part 25 with respect to the input shaft part 24.

In this embodiment, the second joint shaft J2 is provided with: an input-side encoder 26A that detects a rotation angle of the rotation shaft 22a of the motor 22; and an output-side encoder 26B that detects a rotation angle of the first arm 4 with respect to the swivel body 3. The input-side encoder 26A is provided on the motor 22, for example, and includes a scale member (not shown) that is fixed to the rotation shaft 22a of the motor 22 and a sensor (not shown) that optically reads an angle-detection pattern provided on the scale member.

As in the input-side encoder 26A, the output-side encoder 26B includes a scale member 27 and a sensor 28. As shown in FIGS. 4 and 5, the scale member 27 of the output-side encoder 26B is formed in a ring shape having a central hole 29, and a pattern is provided on an outer circumferential surface formed of a cylindrical surface 27a. The scale member 27 is detachably fixed on an attachment surface 4a that is provided in the opposite side surface of the first arm 4 from the surface on which the reducer 23 is fixed.

Figure 6:
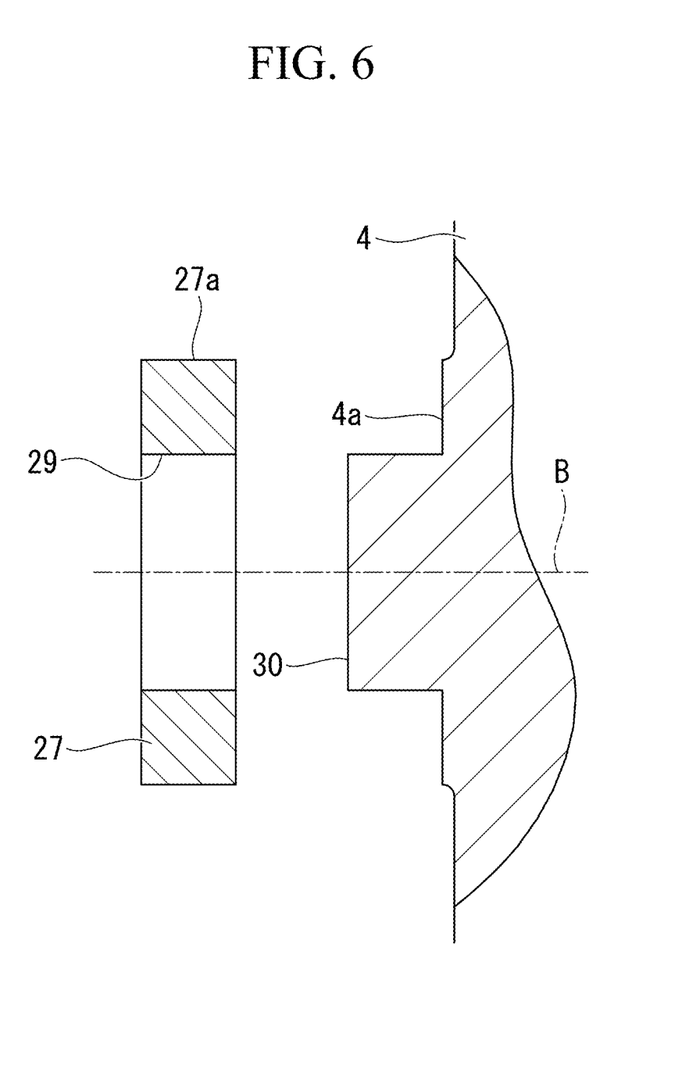
FIG. 6 is a partial longitudinal sectional view for explaining attachment/detachment of a scale member to/from a side surface of a first arm shown in FIG. 5.

As shown in FIG. 6, the attachment surface 4a is provided with a cylindrical protrusion (protruding section) 30 that extends in a direction perpendicular to the second axis B and that has the second axis B as the center axis. The protrusion 30 is fitted into the central hole 29 of the scale member 27, thereby making it possible to accurately position the scale member 27 with respect to the first arm 4 in a direction perpendicular to the second axis B.

The scale member 27 is made to abut against the attachment surface 4a, thereby making it possible to accurately position the scale member 27 with respect to the first arm 4 in the direction of the second axis B. The scale member 27 is detachably attached to the first arm 4, for example, by fastening bolts (not shown) into screw holes (not shown) provided in the attachment surface 4a.

As shown in FIG. 4, the sensor 28 of the output-side encoder 26B for the second joint shaft J2 is fixed to a fixing member 31 that is fixed to the swivel body 3. The sensor 28 is attached to the fixing member 31 such that the position of the sensor 28 can be adjusted in a direction perpendicular to the second axis B. The structure of the sensor 28 is the same as that of the sensor 19 for the first joint shaft J1.

Since the third joint shaft J3 has a structure similar to the second joint shaft J2 except that the swivel body 3 in the second joint shaft J2 is replaced with the second arm 5, a description thereof will be omitted. Since the fourth joint shaft J4 has a structure similar to the first joint shaft J1 except that the base 2 in the first joint shaft J1 is replaced with the wrist unit 6, and the swivel body 3 is replaced with the second arm 5, a description thereof will be omitted. In FIGS. 1 and 2, identical reference signs are assigned to the configurations of the first joint shaft J1 and the fourth joint shaft J4, and identical reference signs are also assigned to the configurations of the second joint shaft J2 and the third joint shaft J3.

The operation of the thus-configured robot 1 of this embodiment will be described below. According to the robot 1 of this embodiment, when rotational driving forces generated by the motors 7 and 22 are input to the reducers, the rotations of the rotation shafts 7a and 22a of the motors 7 and 22 are reduced by the reducers 8 and 23, and the input shaft part 12 and the output shaft part 13 of the reducer 8 are relatively rotated, and the input shaft part 24 and the output shaft part 25 of the reducer 23 are relatively rotated.

Accordingly, a high torque amplified by the reducer 8 rotationally drives the swivel body 3 with respect to the base 2 in the first joint shaft J1, a high torque amplified by the reducer 23 rotationally drives the first arm 4 with respect to the swivel body 3 in the second joint shaft J2, a high torque amplified by the reducer 23 rotationally drives the second arm 5 with respect to the first arm 4 in the third joint shaft J3, and a high torque amplified by the reducer 8 rotationally drives the wrist unit 6 with respect to the second arm 5 in the fourth joint shaft J4. The fifth and sixth joints J5 and J6 are similarly operated.

In this case, according to the robot 1 of this embodiment, in the first to third joint shafts J1, J2, and J3, which affect the position of the wrist distal end in a 3D space, and in the fourth joint shaft J4, the output-side encoders 17B and 26B are provided in addition to the input-side encoders 17A and 26A, which detect the rotation angles of the rotation shafts 7a and 22a of the motors 7 and 22. Accordingly, even if deflection or wobble due to insufficient rigidity of the internal mechanisms of the reducers 8 and 23 occurs, because the rotation angles detected by the input-side encoders 17A and 26A and the rotation angles detected by the output-side encoders 17B and 26B are both used, there is an advantage in that it is possible to improve the accuracy of the rotation angle of each of the joint shafts J1, J2, J3, and J4 and to improve the positioning accuracy and the trajectory accuracy of the wrist distal end.

In each of the first joint shaft J1 and the fourth joint shaft J4, the reducer 8 is formed in a hollow structure, the guide tube 15, which passes through the hollow part 8A, is installed therein, and the motor 7 is disposed, at a position away from the corresponding rotation axis A or D, by the pair of gears 9 and 10, which are power transmission members. Accordingly, it is possible to secure a space on the extension of the hollow part 8A, to make the wire body 16 pass through the inside of the guide tube 15, and to dispose the wire body 16 in the vicinity of the rotation axis A or D in a substantially straight line along the rotation axis A or D. By doing so, even when the swivel body 3 is rotated about the first axis A with respect to the base 2 and the wrist unit 6 is rotated about the fourth axis D with respect to the second arm 5, over large operating angle ranges, the wire body 16 is not subjected to large bending, thus making it possible to maintain the soundness of the wire body 16.

Because one end of the guide tube 15, through which the wire body 16 is made to pass, is fixed to the output shaft part 13 of the reducer 8, when the motor 7 is driven, the output shaft part 13 is rotated relative to the input shaft part 12, and the guide tube 15, which is fixed to the output shaft part 13, is also rotated relative to the input shaft part 12. Then, because the scale member 18 is fixed to the guide tube 15, and the sensor 19 is indirectly fixed to the input shaft part 12 via the swivel body 3 or the second arm 5, relative rotation that is the same as the relative rotation between the input shaft part 12 and the output shaft part 13 occurs between the sensor 19 and the scale member 18. Accordingly, the relative rotation angle between the input shaft part 12 and the output shaft part 13 can be accurately detected by the output-side encoder 17B.

In each of the second joint shaft J2 and the third joint shaft J3, the scale member 27 is directly attached on the attachment surface 4a, which is provided in the opposite side surface of the link member 4 or 5, to which the output shaft part 25 of the reducer 23 is fixed, from the output shaft part 25. Then, the sensor 28 is indirectly fixed to the input shaft part 24 via the fixing member 31, which is fixed to the swivel body 3 or the first arm 4. Accordingly, also in the second joint shaft J2 and the third joint shaft J3, the relative rotation angle between the input shaft part 24 and the output shaft part 25 can be accurately detected by the output-side encoder 26B.

In this case, according to this embodiment, in the first joint shaft J1 and the fourth joint shaft J4, rotation of the output shaft part 13 is extracted at the opposite side of the input shaft part 12 from the output shaft part 13, by using the guide tube 15, which guides the wire body 16 in a penetrating state and which passes through the hollow part 8A of the reducer 8. In the second joint shaft J2 and the third joint shaft J3, the scale member 27 is directly attached on the attachment surface 4a, which is provided in the opposite side surface of the link member 4 or 5, to which the output shaft part 25 is fixed, from the output shaft part 25.

Accordingly, in each of the first to fourth joint shafts J1, J2, J3, and J4, the corresponding output-side encoder 17B or 26B is disposed outside the corresponding two adjacent link members of the link members 2, 3, 4, 5, and 6, instead of between the corresponding two adjacent link members of the link members 2, 3, 4, 5, and 6. As a result, there is an advantage in that it is easy to access the output-side encoders 17B and 26B from the outside, and it is possible to exchange and adjust the scale members 18 and 27 and the sensors 19 and 28 without disassembling the robot 1.

Furthermore, in each of the second joint shaft J2 and the third joint shaft J3, because the scale member 27 is formed in a ring-plate shape and is attached to the attachment surface 4a, which is provided in the side surface of the first arm 4 or the second arm 5 and which extends in a direction perpendicular to the rotation axis B or C, it is possible to prevent the attached scale member 27 from significantly protruding from the outer surface of the first arm 4 or the second arm 5 and to avoid interference between a peripheral object and the output-side encoder 26B when the robot 1 is operated. Specifically, there is an advantage in that, while the scale member 27 is disposed at such a position as to be easily accessed from the outside of the robot 1, the occurrence of interference during operation of the robot 1 can be suppressed as much as possible.

The angle-detection pattern is formed on the cylindrical surface 27a of the scale member 27, and the sensor 28 is disposed radially outward with respect to the cylindrical surface 27a so as to be opposed thereto with a space therebetween, thereby preventing the sensor 28 from being disposed in the thickness direction of the plate-like scale member 27. Accordingly, there is an advantage in that it is possible to suppress an increase in the thickness dimension of the output-side encoder 26B in the direction along the rotation axis B or C and to further suppress the occurrence of interference during operation of the robot 1.

Figure 7:
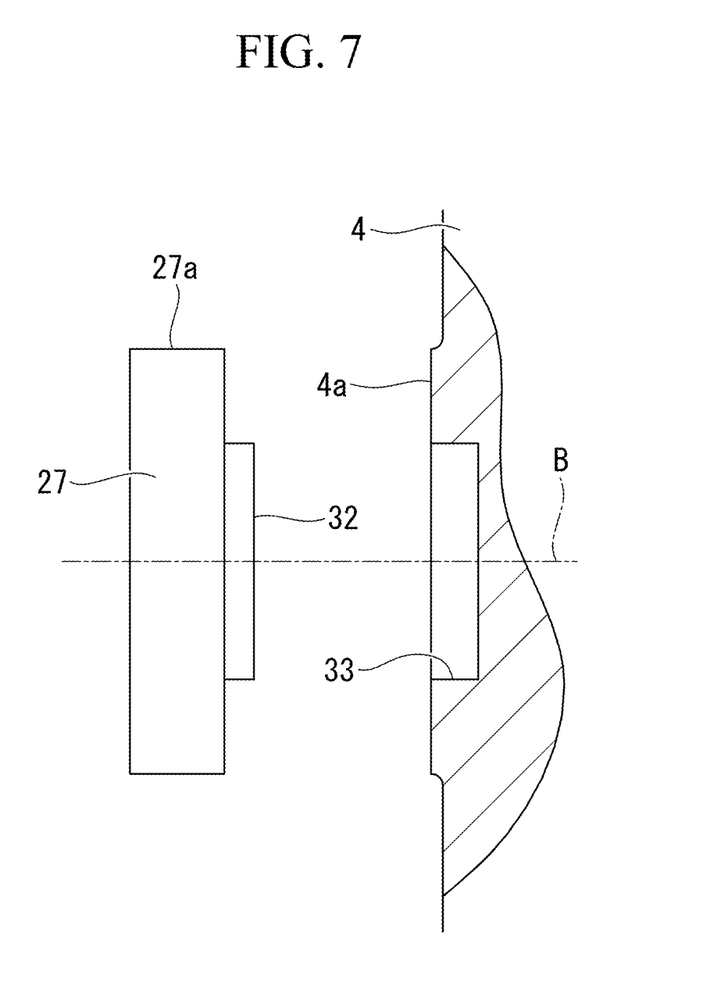
FIG. 7 is a longitudinal sectional view showing a modification of the structure shown in FIG. 6.

Note that, in this embodiment, although the cylindrical protrusion 30 is provided on the side surface of the first arm 4 or the side surface of the second arm 5, and the protrusion 30 is fitted into the central hole 29 of the ring-shaped scale member 27, instead of this, as shown in FIG. 7, it is also possible to form the scale member 27 in a plate-like shape, to provide a cylindrical protrusion 32 thereon in the thickness direction, and to provide a recessed section 33 into which the protrusion 32 is fitted, on the attachment surface 4a of the first arm 4 or the second arm 5.

Although the scale member 27 is formed in a ring shape, since the operating angle range of each of the second joint shaft J2 and the third joint shaft J3 is limited to an angle range less than 360°, the cylindrical surface 27a, on which the pattern is formed, may also be provided partially in the circumferential direction. The section other than the cylindrical surface 27a may have an arbitrary shape.

Although optical encoders are shown as the input-side encoders 17A and 26A and the output-side encoders 17B and 26B, the encoders are not limited thereto, and it is also possible to adopt arbitrary non-contact encoders or contact encoders, such as optical or magnetic encoders.

In this embodiment, for example, in the first joint shaft J1, although a description has been given of an example case in which the output shaft part 13 of the reducer 8 is fixed to the base 2, which is installed on the floor surface, the motor 7 and the input shaft part 12 are fixed to the swivel body 3, which is rotationally driven with respect to the base 2, and the output shaft part 13 is rotated with respect to the fixed input shaft part 12, the arrangement may be vice versa. Specifically, the motor 7 and the input shaft part 12 may be fixed to the base 2, the output shaft part 13 may be fixed to the swivel body 3, and the output shaft part 13 may be rotated with respect to the fixed input shaft part 12. In this case, the guide tube 15 needs to be fixed to the input shaft part 12.

For example, in the second joint shaft J2, although a description has been given of an example case in which the motor 22 and the input shaft part 24 of the reducer 23 are fixed to the swivel body 3, the output shaft part 25 is fixed to the first arm 4, and the output shaft part 25 is rotated with respect to the input shaft part 24, the arrangement may be vice versa. Specifically, the output shaft part 25 may be fixed to the swivel body 3, the motor 22 and the input shaft part 24 may be fixed to the first arm 4, and the input shaft part 24 may be rotated with respect to the fixed output shaft part 25. In this case, the attachment surface 4a for the scale member 27 needs to be provided on the swivel body 3.

Although FIG. 3 shows a case in which the guide tube 15 is directly fixed to the output shaft part 13, instead of this, the guide tube 15 may also be indirectly fixed to the output shaft part 13 by being fixed to the base 2.

In this embodiment, because the structure used in the first joint shaft J1 and the fourth joint shaft J4 can be adopted in any of the other joint shafts J2, J3, J5, and J6, it is also possible to employ an embodiment obtained by adopting the structure in any of the other joints J2, J3, J5, and J6.

In this embodiment, although a description has been given of the structures including the output-side encoders 17B and 26B, as the first joint shaft J1, the second joint shaft J2, the third joint shaft J3, and the fourth joint shaft J4, it is also possible for at least one of the first joint shaft J1, the second joint shaft J2, the third joint shaft J3, and the fourth joint shaft J4 to include the output-side encoder 17B or 26B, and for the other joint shafts to adopt a structure that does not include the output-side encoder 17B or 26B.

The invention claimed is:

1. A robot including
   a first link member and a second link member that are coupled so as to be rotatable about a rotation axis,
   a reducer that has an input shaft part fixed to the first link member and an output shaft part fixed to the second link member,
   a motor that generates a rotational driving force to be input to the reducer, and
   an input-side encoder that detects a rotation angle of a rotation shaft of the motor, an outer surface of the first link member and an outer surface of the second link member being externally accessible when the robot is assembled, the robot comprising:
   an output-side encoder that detects a relative rotation angle between the first link member and the second link member; and
   a fixing member that has one end and the other end, the one end being fixed to the input shaft part by being fixed to the outer surface of the first link member, and the other end being disposed on the outer surface of the second link member,
   wherein the fixing member is provided along the outer surface of the second link member from the one end to the other end,
   wherein the output-side encoder comprises:
      a plate-like scale member that has an angle-detection pattern; and
      a sensor that detects the angle-detection pattern; and
   wherein the scale member is attached on the outer surface of the second link member, and the sensor is attached on the other end of the fixing member so as to be opposed to the scale member in a direction perpendicular to the rotation axis.

2. The robot according to claim 1, wherein
   a cylindrical protrusion is formed on the outer surface of the second link member, a central axis of the protrusion comprising the rotation axis;
   the scale member is formed in a cylindrical shape having a central hole and is attached on the outer surface of the second link member by the central hole being fitted to the protrusion.

3. The robot according to claim 1, wherein
   a cylindrical recess is formed on the outer surface of the second link member, a central axis of the recess comprising the rotation axis;
   the scale member has a protrusion formed in a cylindrical shape and is attached on the outer surface of the second link member by the protrusion being fitted to the recess.

\* \* \* \* \*